United States Patent
Zhang et al.

(10) Patent No.: US 11,023,501 B2
(45) Date of Patent: Jun. 1, 2021

(54) METHOD AND APPARATUS FOR DISPLAYING MAP INFORMATION AND STORAGE MEDIUM

(71) Applicant: Baidu Online Network Technology (Beijing) Co., Ltd., Beijing (CN)

(72) Inventors: Jing Zhang, Beijing (CN); Weiguo Xie, Beijing (CN); Zhiqing Luo, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 245 days.

(21) Appl. No.: 15/756,471

(22) PCT Filed: Dec. 8, 2015

(86) PCT No.: PCT/CN2015/096625
§ 371 (c)(1),
(2) Date: Feb. 28, 2018

(87) PCT Pub. No.: WO2017/035975
PCT Pub. Date: Mar. 9, 2017

(65) Prior Publication Data
US 2019/0087442 A1  Mar. 21, 2019

(30) Foreign Application Priority Data
Aug. 31, 2015  (CN) .......................... 201510549240.1

(51) Int. Cl.
*G06F 16/29* (2019.01)
*G06F 16/00* (2019.01)
*G06F 16/245* (2019.01)
*G06F 16/248* (2019.01)

(52) U.S. Cl.
CPC .............. *G06F 16/29* (2019.01); *G06F 16/00* (2019.01); *G06F 16/245* (2019.01); *G06F 16/248* (2019.01)

(58) Field of Classification Search
CPC ...................................................... G06F 16/29
(Continued)

(56) References Cited

U.S. PATENT DOCUMENTS 6,772,142 B1 *  8/2004  Kelling .................. G06F 16/29
                                                      707/724
9,182,895 B1 * 11/2015  Gold ..................... G09B 29/12
(Continued)

FOREIGN PATENT DOCUMENTS

CN        103258057 A      8/2013
CN        103258730 A      8/2013
(Continued)

OTHER PUBLICATIONS

International Search Report dated Jun. 1, 2016 for International Application No. PCT/CN2015/096625, 4 pages.
(Continued)

*Primary Examiner* — Robert W Beausoliel, Jr.
*Assistant Examiner* — Pedro J Santos
(74) *Attorney, Agent, or Firm* — Knobbe, Martens, Olson & Bear, LLP (57) ABSTRACT

Embodiments of the present disclosure disclose a method and apparatus for displaying map information and a storage medium, the method comprising: acquiring a map query request submitted by a user; creating an independent layer of a request object related to the map query request based on the map query request; and displaying the independent layer to the user on an electronic map display interface. The method and apparatus for displaying map information and the storage medium provided by the embodiments of the present disclosure enable the user to clearly identify a request object from an electronic map.

16 Claims, 9 Drawing Sheets

(58) Field of Classification Search
USPC .......................................................... 707/722
See application file for complete search history.

(56) References Cited

U.S. PATENT DOCUMENTS

| | | | |
|---|---|---|---|
| 2009/0027418 A1* | 1/2009 | Maru | G09B 29/007 |
| | | | 345/629 |
| 2009/0171576 A1 | 7/2009 | Kim et al. | |
| 2011/0066035 A1* | 3/2011 | Norris | A61B 5/6852 |
| | | | 600/478 |
| 2011/0270705 A1 | 11/2011 | Parker et al. | |
| 2012/0278752 A1 | 11/2012 | Parker et al. | |
| 2015/0038161 A1* | 2/2015 | Jakobson | H04W 4/02 |
| | | | 455/456.1 |
| 2015/0081659 A1 | 3/2015 | Park et al. | |
| 2015/0229603 A1* | 8/2015 | Chor | H04L 67/02 |
| | | | 235/494 |
| 2018/0301111 A1* | 10/2018 | Park | G09B 29/007 |

FOREIGN PATENT DOCUMENTS

| | | |
|---|---|---|
| CN | 103902788 A | 7/2014 |
| EP | 3336715 | 6/2018 |
| JP | 2003-281154 A | 10/2003 |
| KR | 10-2015-0031957 A | 3/2015 |
| KR | 10-2015-0067901 A | 6/2015 |
| WO | WO2016090887 | 6/2016 |

OTHER PUBLICATIONS

Written Opinion of the International Searching Authority dated Jun. 1, 2016 for International Application No. PCT/CN2015/096625, 3 pages.
Japanese Office Action dated Apr. 15, 2019 for Japanese Patent Application No. JP 2018-529699, which cites the above-identified reference numbered 1, and which shares priority of Chinese Patent Application No. CN 201510549240.1 with subject U.S. Appl. No. 15/756,471.

* cited by examiner

Fig. 13

METHOD AND APPARATUS FOR DISPLAYING MAP INFORMATION AND STORAGE MEDIUM

CROSS-REFERENCE TO RELATED APPLICATION

This application is the U.S. National Phase Application under 35 U.S.C. § 371 of International Application No. PCT/CN2015/096625, filed Dec. 8, 2015, designating the U.S. and published as WO 2017/035975 A1 on Mar. 9, 2017, which claims the priority of Chinese Patent Application No. 201510549240.1, entitled "Method and Apparatus for Displaying Map Information," filed by Baidu Online Network Technology (Beijing) Co., Ltd. as the applicant on Aug. 31, 2015, each of which is incorporated herein by reference in its entirety.

TECHNICAL FIELD

Embodiments of the present disclosure relate to the field of position-based service technology, in particular, to a method and apparatus for displaying map information and a storage medium.

BACKGROUND

An electronic map refers to a digital image produced and used in a computer environment, which constitutes spatial and attribute information, and may be processed in real time. It not only contains various geographical core elements of a paper map, but also includes other environmental information and related contents, and has multi-dimensional environment information features. Compared with the paper map, the electronic map has unlimited information, and may be added at one's own will. It is not subject to scale and graphics style restrictions. It stores and represents the map elements in a more abstract fashion, and may use the concept of an object to represent a variety of map elements, as well as intelligently display requisite information based on the user's intention.

Figure 1:
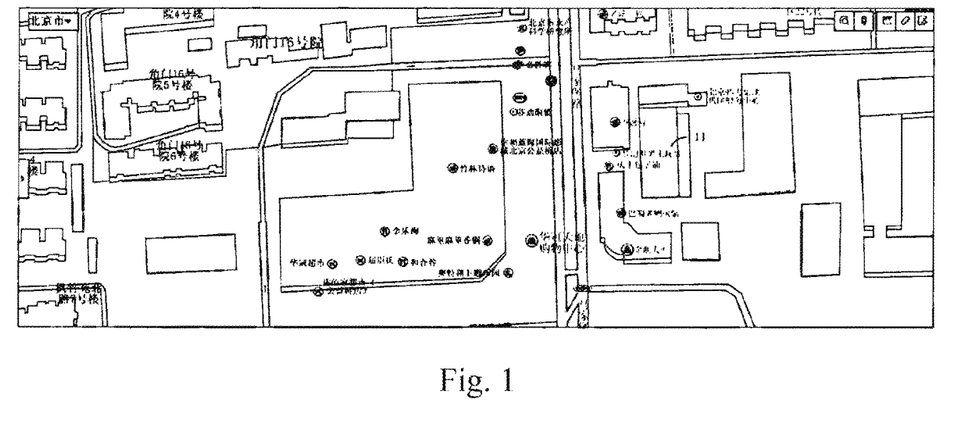
FIG. 1 is a schematic diagram of an electronic map display interface provided by the prior art.

The existing electronic map needs to display a wide variety of information to the user in a relatively small display area. FIG. 1 shows a display interface of an electronic map provided by the existing technology. On the display interface, shop 11 is the object that the user actually wants to view. However, on this display interface, the shop 11 is inundated by information that is unrelated to the user's viewing needs. The user needs to carefully distinguish, in order to identify the shop 11 on the display interface. In other words, the existing electronic map display interface covers too many kinds of information, resulting in the user's difficulty in reading the map.

SUMMARY

In view of the above technical problems, embodiments of the present disclosure provide a method and apparatus for displaying map information and a storage medium so that a user can clearly identify a request object from an electronic map.

In a first aspect, the embodiments of the present disclosure provide a method for displaying map information, the method comprising:

acquiring a map query request submitted by a user;

creating an independent layer of a request object related to the map query request based on the map query request; and displaying the independent layer to the user on an electronic map display interface.

In a second aspect, the embodiments of the present disclosure provide an apparatus for displaying map information, the apparatus comprising:

a request acquisition module, configured to acquire a map query request submitted by a user;

a layer creating module, configured to create an independent layer of a request object related to the map query request based on the map query request; and a layer displaying module, configured to display the independent layer to the user on an electronic map display interface.

In a third aspect, the embodiments of the present disclosure also provide a storage medium containing computer-executable instructions, the computer-executable instructions, when executed by a computer processor, is used for performing a method for displaying map information, the method comprising the following steps:

acquiring a map query request submitted by a user;

creating an independent layer of a request object related to the map query request based on the map query request; and displaying the independent layer to the user on an electronic map display interface.

The method and apparatus for displaying map information and the storage medium provided by the embodiments of the present disclosure, by acquiring a map query request submitted by a user, creating an independent layer of a request object related to the map query request based on the map query request, and displaying the independent layer to the user on an electronic map display interface, enables the user to clearly identify the request object from the electronic map.

BRIEF DESCRIPTION OF THE DRAWINGS

To describe the technical solutions in the embodiments of the present disclosure more clearly, the accompanying drawings required for describing the embodiments will be briefly described as follows. Naturally, the accompanying drawings in the following description show merely some embodiments of the present disclosure, and those skilled in the art may make modifications and substitutions to these drawings without inventive efforts.

DETAILED DESCRIPTION OF EMBODIMENTS

The technical solutions in the embodiments of the present disclosure will be clearly and completley described below in combination with the accompanying drawings. Evidently, the described embodiments are part of the embodiments of the present disclosure rather than all of the embodiments. The described embodiments are used to explain the principals of the present disclosure, rather than limit the present disclosure to these specific embodiments. All other embodiments obtained by those skilled in the art, based on the embodiments of the present disclosure and without inventive efforts, fall into the protection scope of the present disclosure.

First Embodiment

The present embodiment provides a technical solution of a method for displaying an electronic map. The method for displaying an electronic map is performed by a display apparatus of an electronic map. Preferably, the display apparatus of the electronic map is typically integrated in a server for providing position-based services. Certainly, the display apparatus of the electronic map may also be integrated in a PC or workstation for running stand-alone electronic map software. The present disclosure is not limited thereto.

Figure 2:
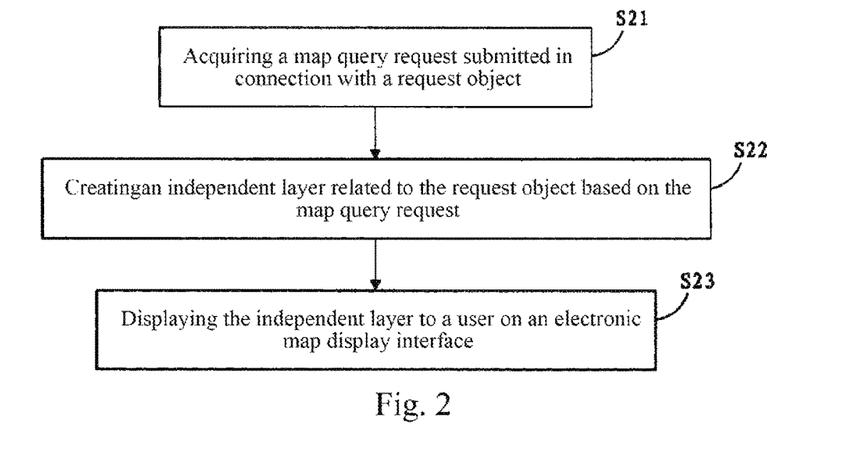
FIG. 2 is a flowchart of a method for displaying map information provided by the first embodiment of the present disclosure.

Referring to FIG. 2, the method for display an electronic map includes:

S21, acquiring a map query request submitted by a user.

Each map query operation of the user is performed based on a map query request.

It should be understood that the map query request submitted by the user is a query request for the request object. For example, if the query word submitted by the user is "Tiananmen", the user's request object may be the Tiananmen Square, or the Tiananmen Tower. If the query word submitted by the user is "Millennium Monument", the user's request object is the China Millennium Monument.

Preferably, acquiring the map query request submitted in connection with the request object by the user comprises: acquiring a text search word corresponding to the request object entered by the user, scanning a QR code of the request object, or triggering a map query request for the request object caused by a third party invoking an application program interface.

S22, creating an independent layer of a request object related to the map query request based on the map query request.

In order to allow the user to identify his request object more clearly on the display interface of the electronic map, in the present disclosure, an independent layer is created for the request object for its own. On the independent layer, the request object is presented in a manner different from other map elements on the electronic map. In this way, after submitting the map query request, the user can identify his/her own request object more clearly on the returned electronic map display interface.

In addition, preferably, in addition to presenting the request object on an independent layer in a manner different from other map elements, other map elements associated with the request object may also be presented in a manner different from other map elements on the independent layer. These other map elements associated with the request object include: public service facilities such as catering, entertainment near the request object, paths to the request object, etc.

S23, displaying the independent layer to the user on an electronic map display interface.

After creating the independent layer, the independent layer is displayed to the user on the display interface of the electronic map application. Specifically, the independent layer may be superimposed with the other layers of the electronic map and displayed to the user.

Figure 3:
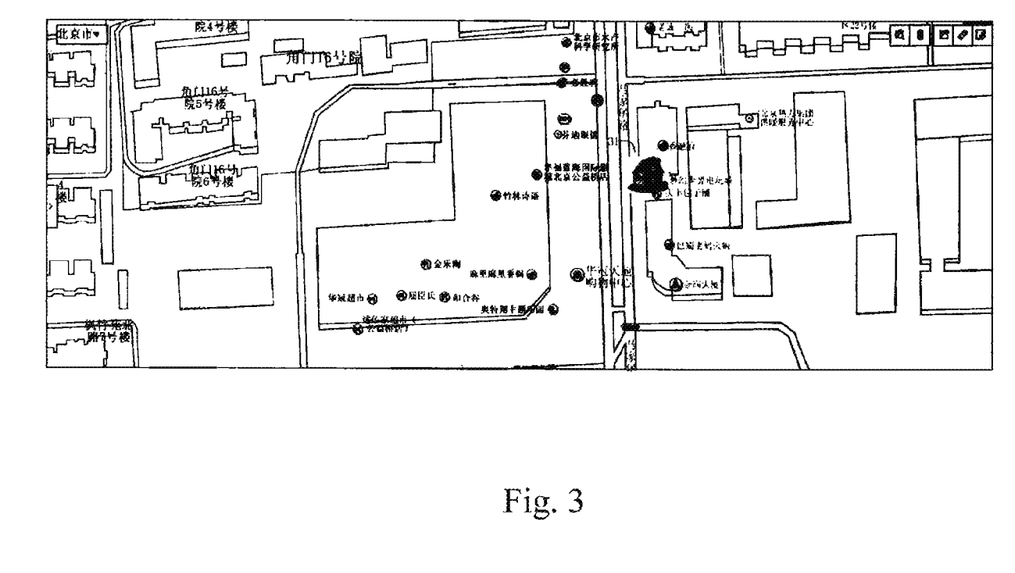
FIG. 3 is a schematic diagram of an electronic map display interface provided by the first embodiment of the present disclosure.

FIG. 3 shows a display interface of an electronic map after adopting the independent layer. Referring to FIG. 3, after adding the independent layer for the request object, the request object is presented in a manner different from the other map elements on the display interface of the electronic map. Preferably, the request object is displayed in the form of an independent icon 31 on the display interface of the electronic map. In this way, the user can clearly identify the request object on the display interface of the electronic map.

It should be noted that the independent layer may be started or deactivated based on the user's input instruction on the display interface of the electronic map. After the independent layer is started, due to the existence of the independent layer, the user can clearly see the request object of the map query request submitted by his/her own more directly on the display interface.

By acquiring the map query request submitted by the user, creating the independent layer of the request object related to the map query request based on the map query request, and displaying the independent layer to the user on the electronic map display interface, the present embodiment enables the user to clearly identify the request object from the electronic map.

Second Embodiment

Based on the first embodiment of the present disclosure, the present embodiment further provides a technical solution for creating a layer in the method for displaying an electronic map. In the technical solution, creating an independent layer related to the request object based on the map query request includes: acquiring at least one map element corresponding to the request object; creating an empty independent layer; and adding the map element to the independent layer.

Figure 4:
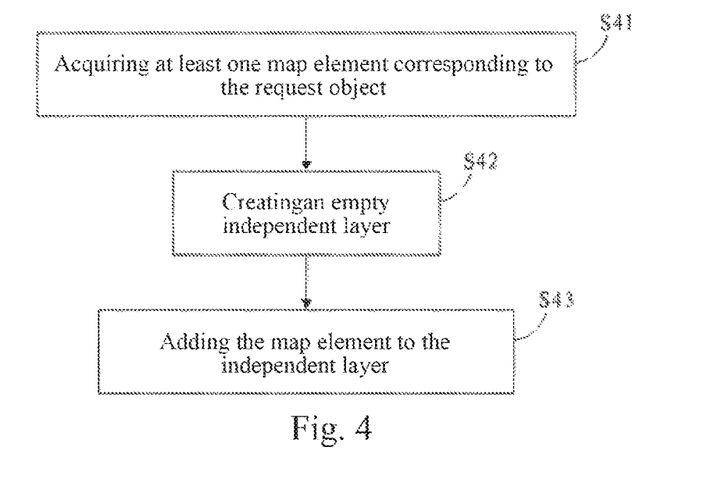
FIG. 4 is a flowchart of creating a layer in the method for displaying map information provided by the second embodiment of the present disclosure.

Referring to FIG. 4, creating an independent layer related to the request object based on the map query request includes:

S41, acquiring at least one map element corresponding to the request object.

The process of acquiring a map element corresponding to the request object is typically a process of matching the name of the map element with the query word in the map query request submitted by the user. For example, if the query word in the map query request submitted by the user is "Xisi", the map elements containing "Xisi" in the names should be obtained as at least one map element corresponding to the request object.

Specifically, acquiring the corresponding map element is to acquire basic attribute of the map element, such as the specific geographic location, the attribute category of the map element, and the like.

S42, creating an empty independent layer.

To add an independent layer for the map element, an empty independent layer should be first created for the map element. The so-called blank means that the created independent layer does not contain any map elements such as point, line and side.

S43, adding the map element to the independent layer.

Specifically, the map element may be added to the independent layer based on the geographic location of the map element. Further, it is also possible to add corresponding explanatory text for the map element based on other attributes such as the attribute category of the map element.

Figure 5:
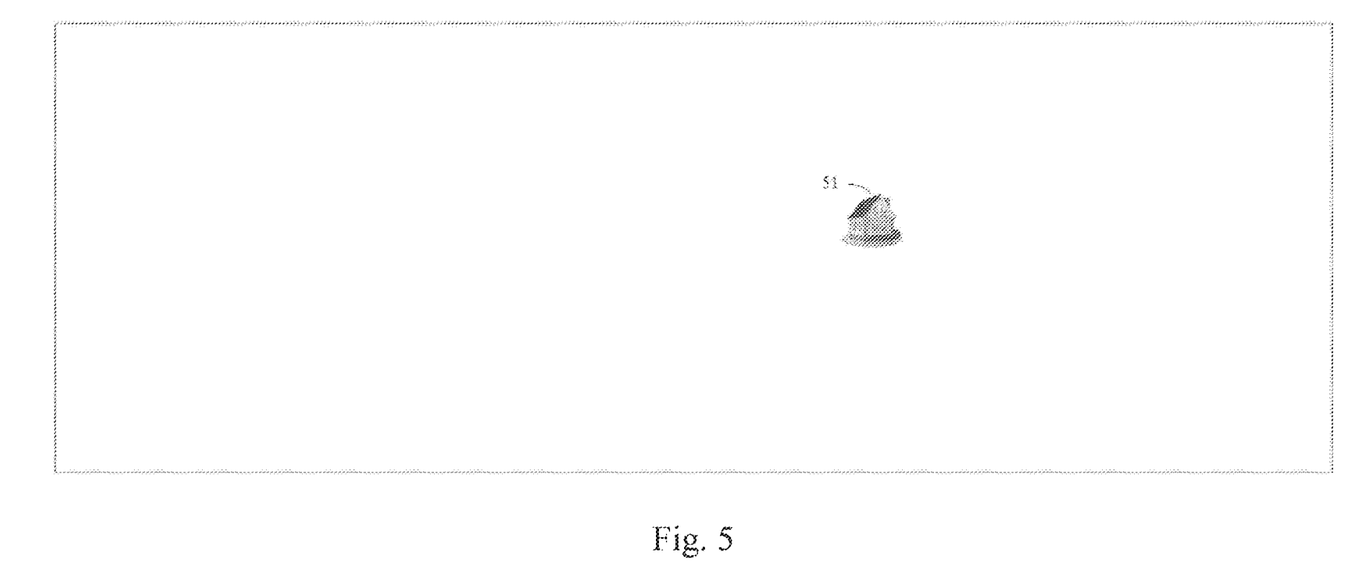
FIG. 5 is a schematic diagram of the created layer provided by the second embodiment of the present disclosure.

FIG. 5 shows an independent layer created according to the method provided by the present embodiment. Referring to FIG. 5, the request object is displayed in a manner different from the map elements of the other layers on the independent layer. More specifically, the independent layer uses an icon 51 different from the map elements of the other layers to display the request object.

By acquiring at least one map element corresponding to the request object, creating an empty independent layer, and adding the map element to the independent layer, the present embodiment completes the creating of the independent layer for the request object.

Third Embodiment

Based on the second embodiment of the present disclosure, the present embodiment further provides a technical solution for creating a layer in the method for displaying an electronic map. In the technical solution, after adding the map element to the independent layer, creating a geographic layer related to the request object based on the map query request further includes: acquiring at least one associated map element associated with the request object; and adding the associated map element to the independent layer.

Figure 6:
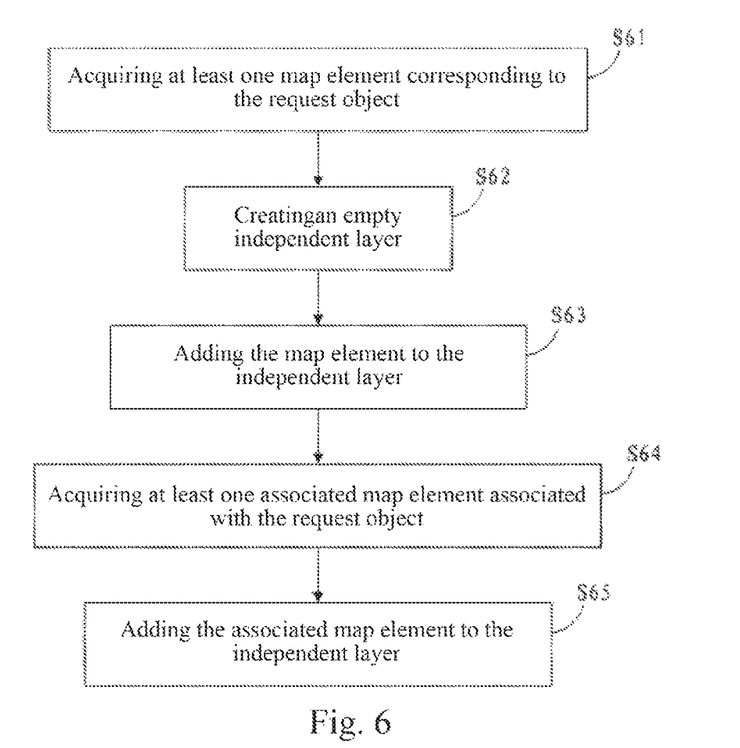
FIG. 6 is a flowchart of creating a layer in the method for displaying map information provided by the third embodiment of the present disclosure.

Referring to FIG. 6, creating a geographic layer related to the request object based on the map query request includes:

S61, acquiring at least one map element corresponding to the request object.

S62, creating an empty independent layer.

S63, adding the map element to the independent layer.

S64, acquiring an associated map element associated with the request object.

It should be understood that on the display interface of the electronic map, there are also some map elements associated with the request object. These map elements may be service facilities that are of interest to the user near the request target, and may also be path tracks to the request target. For example, if the user has a particular interest in e-sports, the map elements associated with the request object may include game centers near the request target.

Moreover, the map element associated with the request object is referred to as the associated map element.

For the associated map elements such as service facilities that are of interest to the user near the request target, they may be acquired based on the distance between them and the request object and the attribute categories of the associated map elements themselves. As for the path tracks to the request object, they may be acquired by path planning.

S65, adding the associated map element to the independent layer.

Specifically, the adding operation is performed in accordance with the specific geographical location of the associated map element.

Figure 7:
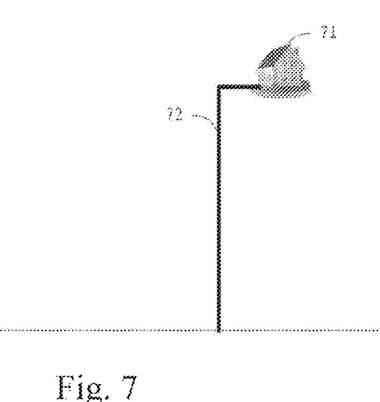
FIG. 7 is a schematic diagram of the created layer provided by the third embodiment of the present disclosure.

FIG. 7 shows an independent layer created according to the method provided by the present embodiment. Referring to FIG. 7, a path 72 to the request object is given in addition to the request object displayed in the form of a special icon 71 on the independent layer.

By adding the map element to the independent layer, acquiring at least one associated map element associated with the request object, and adding the associated map element to the independent layer, the present embodiment not only displays the request target in a manner different from the other map elements, but also displays the map elements associated with the request object in a manner different from the other map elements on the displace interface of the electronic map, further facilitating the user's identification to the displayed elements on the electronic map.

Fourth Embodiment

Based on the second embodiment of the present disclosure, the present embodiment further provides a technical solution of the method for displaying an electronic map. In the technical solution, the method for displaying an electronic map further includes: displaying an associated map elements associated with the request object distinguishably on other layers of the electronic map.

Figure 8:
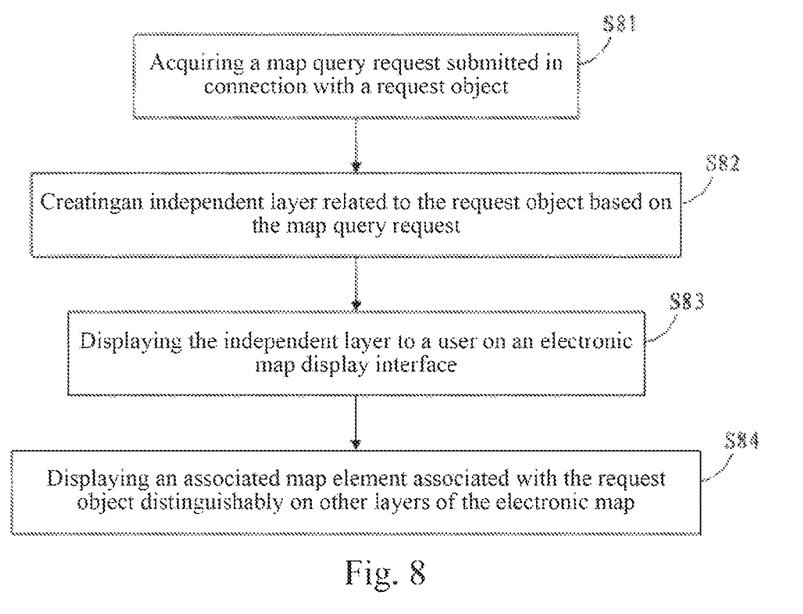
FIG. 8 is a flowchart of the method for displaying map information provided by the fourth embodiment of the present disclosure.

Referring to FIG. 8, the method for displaying an electronic map includes:

S81, acquiring a map query request submitted by a user.

S82, creating an independent layer of a request object related to the map query request based on the map query request.

S83, displaying the independent layer to the user on an electronic map display interface.

S84, displaying an associated map elements associated with the request object distinguishably on other layers of the electronic map.

As is different from the third embodiment of the present disclosure, in the present embodiment, the associated map element is not added to the independent layer, but the display mode of the associated map element is directly changed on the layer to which the associated map element belongs, such as highlighting, so as to achieve the purpose of displaying the associated map element distinguishably.

Specifically, changing the display mode of the associated map element may be realized by changing the display attribute of the associated map element. For example, the display color, the line attribute, or the representative image of the associated map element may be changed to realize a change of the display mode of the associated map element.

By after displaying the independent layer to the user on an electronic map display interface, displaying the associated map elements associated with the request object distinguishably on other layers of the electronic map, the present embodiment not only realizes a distinguishable display of the associated map elements on the electronic map display interface, but also is simple in operation and only has a small amount of computation.

Fifth Embodiment

Based on the above embodiment of the present disclosure, the present embodiment further provides a technical solution of the method for displaying an electronic map. In the technical solution, the method for displaying an electronic map further includes: displaying map elements on other layers with reduced intensity.

Figure 9:
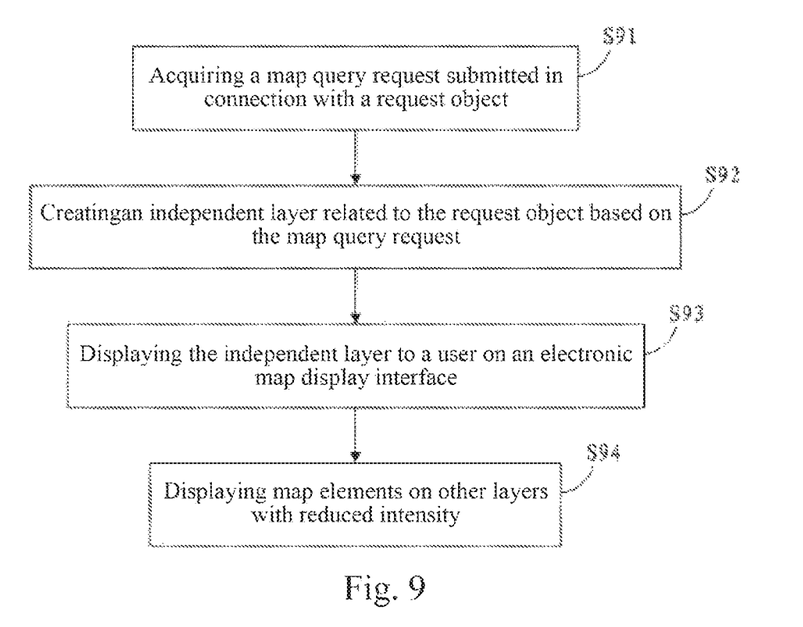
FIG. 9 is a flowchart of the method for displaying map information provided by the fifth embodiment of the present disclosure.

Referring to FIG. 9, the method for displaying an electronic map includes:

S91, acquiring a map query request submitted by a user.

S92, creating an independent layer of a request object related to the map query request based on the map query request.

S93, displaying the independent layer to the user on an electronic map display interface.

S94, displaying map elements on other layers with reduced intensity.

The displaying other map elements with reduced intensity refers to display less information of the other map elements on the electronic map display interface. For example, the other map elements may be not displayed, or only the icons of the other map elements are displayed, and the text description may not be displayed for the other map elements.

In addition, the displaying other map elements with reduced intensity may also be realized by setting different display scale thresholds for the request object and the other map elements. For example, when the display scale of the electronic map become 1:100, the displaying of the request object is started, that is, setting the display scale threshold of the request object as 1:100; and setting the display scale threshold of the request target as 1:10, that is, when the display scale of the electronic map become 1:10, the other map elements are started to be displayed.

Since the request object and the other map elements differ in display scale thresholds, when the display scale of the map is between two different display scale thresholds, only the request object is displayed on the display interface of the electronic map without displaying the other map elements. Thus, the displaying other map elements with reduced intensity is realized.

By after displaying the independent layer to the user on the electronic map display interface, displaying map elements on other layers with reduced intensity, the present embodiment highlights the request object of the user on the display interface of the electronic map and further facilitates the user's identification of the request object.

Sixth Embodiment

Based on the above embodiment of the present disclosure, the present embodiment further provides a technical solution of the method for displaying an electronic map. In the technical solution, the method for displaying an electronic map further includes: changing display styles of other layers of the electronic map based on an attribute type of the request object.

Figure 10:
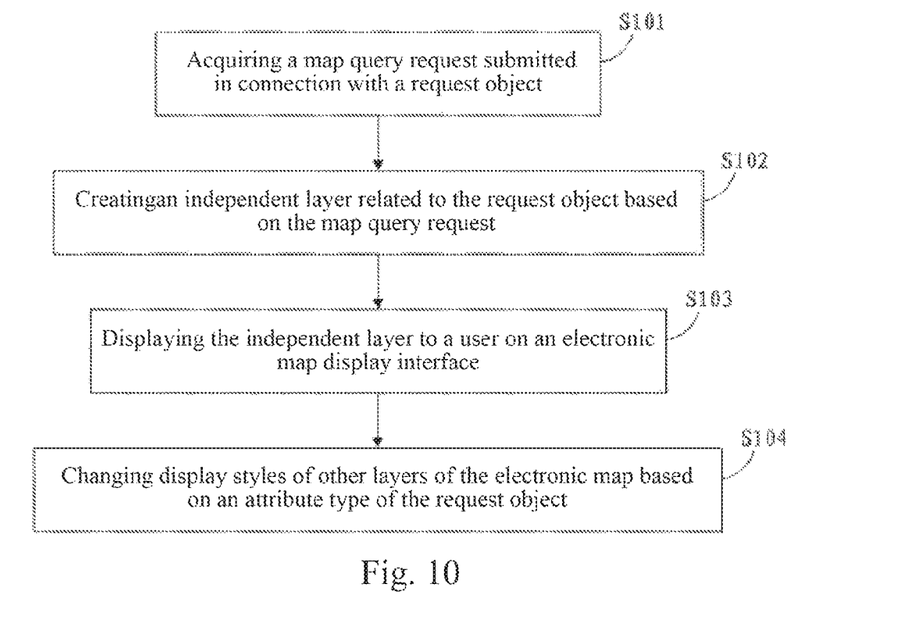
FIG. 10 is a flowchart of the method for displaying map information provided by the sixth embodiment of the present disclosure.

Referring to FIG. 10, the method for displaying an electronic map includes:

S101, acquiring a map query request submitted by a user.

S102, creating an independent layer of a request object related to the map query request based on the map query request.

S103, displaying the independent layer to the user on an electronic map display interface.

S104, changing display styles of other layers of the electronic map based on an attribute type of the request object.

Different request objects correspond to different attribute types. For example, the attribute type of the request object may be divided into workplace and leisure site. Leisure sites may be divided into cultural leisure sites and sports leisure sites. The Mei Lanfang Grand Theater may be classified as a cultural leisure site, and the "Bird's Nest" stadium may be classified as a sports leisure site.

In the present embodiment, the display styles of other layers may be changed based on the attribute type of the request object. The display style may be implemented by the background color, the line attribute, and the building icon of the layer. If the request object is a cultural leisure site, the background color of the other layers may be adjusted to warm colors, and if the request target is a sports leisure site, the background color of the other layers may be adjusted to cool colors.

In this way, when the user's request object is different, the electronic map has different display styles. The user's interest in using the electronic map is increased and the user experience is enhanced.

Figure 11:
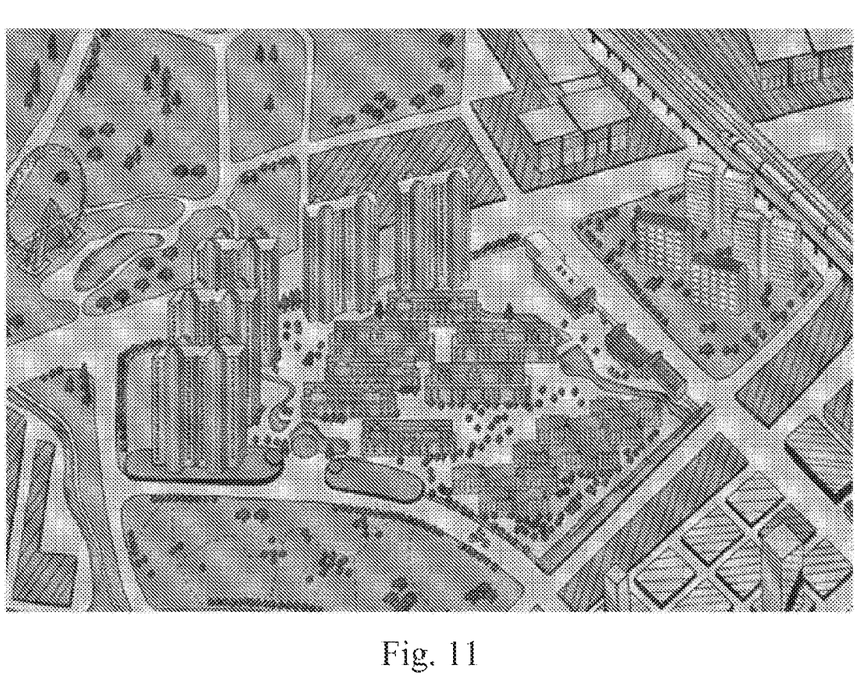
FIG. 11 is a schematic diagram of the electronic map display interface with a changed style provided by the sixth embodiment of the present disclosure.

FIG. 11 shows an electronic map display interface after the style is changed. Referring to FIG. 11, on the electronic map display interface, a variety of buildings are presented in display styles different from those of the previous electronic map, which brings freshness to the user and increases the user's interest in using.

By after displaying the independent layer to the user on the electronic map display interface, changing display styles of other layers of the electronic map based on the attribute type of the request object, and enabling the display style of the electronic map changing on account of different attribute types of the request object, the present embodiment increases the user's interest in using the electronic map and enhances the user experience.

Seventh Embodiment

Based on the above embodiment of the present disclosure, the present embodiment further provides a technical solution of the method for displaying an electronic map. In the technical solution, the method for displaying an electronic map further includes: changing display styles of other layers of the electronic map based on the attribute type of the request object.

Based on the above embodiment of the present disclosure, the present embodiment further provides a technical solution of the method for displaying an electronic map. In the technical solution, the method for displaying an electronic map further includes: providing a URL or a QR code for sharing a display interface of the independent layer.

Figure 12:
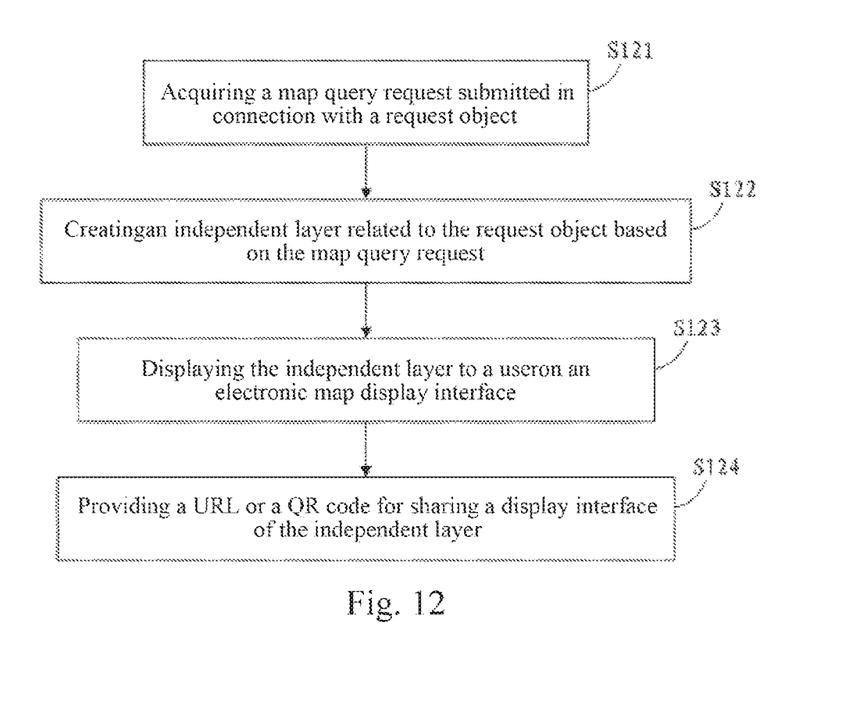
FIG. 12 is a flowchart of the method for displaying map information provided by the seventh embodiment of the present disclosure.

Referring to FIG. 12, the method for displaying an electronic map includes:

S121, acquiring a map query request submitted by a user.

S122, creating an independent layer of a request object related to the map query request based on the map query request.

S123, displaying the independent layer to the user on an electronic map display interface.

S124, providing a URL or a QR code for sharing a display interface of the independent layer.

In the present embodiment, the generated independent layer may not only be displayed together with the other layers, but also may be shared among different users through a URL or a QR code automatically generated.

Preferably, display parameters of the independent layer such as geographic coordinates of the request object in the independent layer, serial number of the display icon of the request object may be used as parameters in the automatically generated URL, or as the encoded parameters of the generated QR code for generating the URL or the QR code.

To generate the URL as an example, it is assumed that the geographical coordinates of the request object are (116.41667, 39.91667) in the independent layer, and the corresponding serial number of the display picture is XFS32609, so that the generated URL may be: http://202.106. 0.20: 8080/long=116.41667 & lat=39.91667 & type=XFS 32609.

By after displaying the independent layer to the user on the electronic map display interface, providing a URL or a QR code for sharing a display interface of the independent layer, and enabling the independent layer can not only be displayed on the electronic map, but also be shared among different users, the present embodiment further facilitates the user's use of the electronic map.

Eighth Embodiment

Figure 13:
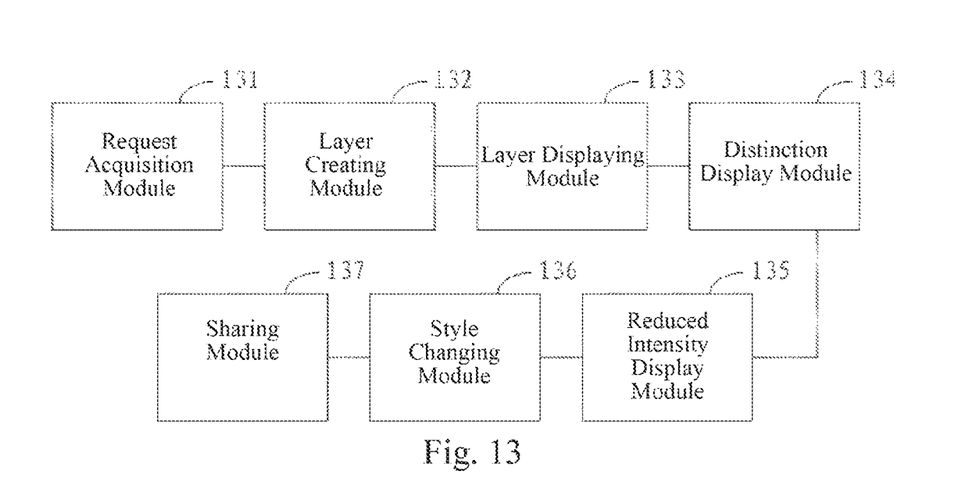
FIG. 13 is a structural diagram of an apparatus for displaying map information provided by the eighth embodiment of the present disclosure.

The present embodiment provides a technical solution of an apparatus for displaying an electronic map. Referring to FIG. 13, in the technical solution, the apparatus for displaying an electronic map includes: a request acquisition module 131, a layer creating module 132 and a layer displaying module 133.

The request acquisition module 131 is configured to acquire a map query request submitted in connection with a request object.

The layer creating module 132 is configured to create an independent layer related to the request object based on the map query request.

The layer displaying module 133 is configured to display the independent layer to the user on an electronic map display interface.

Alternatively, the request acquisition module 131 is specifically configured to: acquire a text search word corresponding to the request object entered by the user, scan a QR code of the request object, or trigger a map query request for the request object caused by a third party invoking an application program interface.

Alternatively, the layer creating module 132 includes: an element acquisition unit, a creating unit and an element adding unit.

The element acquisition unit is configured to acquire at least one map element corresponding to the request object.

The creating unit is configured to create an empty independent layer.

The element adding unit is configured to add the map element to the independent layer.

Alternatively, the layer creating module 132 further includes: an associated element acquisition unit and an associated element adding unit.

The associated element acquisition unit is configured to acquire at least one associated map element associated with the request object.

The associated element adding unit is configured to add the associated map element to the independent layer.

Alternatively, the apparatus for displaying the electronic map further includes: a distinction display module 134.

The distinction display module 134 is configured to display the associated map element associated with the request object distinguishably on other layers of the electronic map.

Alternatively, the apparatus for displaying the electronic map further includes: a reduced intensity display module 135.

The reduced intensity display module 135 is configured to display map elements on other layers with reduced intensity, after displaying the independent layer to the user on the electronic map display interface.

Alternatively, the apparatus for displaying the electronic map further includes: a style changing module 136.

The style changing module 136 is configured to change display styles of other layers of the electronic map based on an attribute type of the request object, after displaying to the user the independent layer on the electronic map display interface.

Alternatively, the apparatus for displaying the electronic map further includes: a sharing module 137.

The sharing module 137 is configured to provide a URL or a QR code for sharing a display interface of the independent layer, after displaying the independent layer to the user on the electronic map display interface.

The apparatus for displaying map information may perform the method for displaying map information provided by any of the embodiments of the present disclosure, and may have a function module and a beneficial effect corresponding to performing the method.

It should be understood by those skilled in the art that the above mentioned modules or steps of the present disclosure may be implemented by a general computing device and may be collectively implemented on a single computing device or distributed on a network formed by several computing devices.

Alternatively, they may be implemented by program codes executable by a computer device so that they may be stored in a storage device to be executed by a computing device, or they may be separately implemented into individual integrated circuit modules, or many modules or steps thereof may be implemented into a single integrated circuit module to be implemented. Accordingly, the present disclosure is not limited to any particular combination of hardware and software.

Ninth Embodiment

A storage medium containing computer executable instructions, the computer executable instructions being configured to execute a method for displaying map information when executed by a computer processor, the method comprising the following steps:

acquiring a map query request submitted in connection with a request object;

creating an independent layer related to the request object based on the map query request; and displaying the independent layer to a user on an electronic map display interface.

When the storage medium performing the method, the acquiring a map query request submitted in connection with a request object includes:

acquiring a text search word corresponding to the request object entered by the user, scanning a QR code of the request object, or triggering a map query request for the request object caused by a third party invoking an application program interface.

When the storage medium performing the method, the creating an independent layer related to the request object based on the map query request includes:
  acquiring at least one map element corresponding to the request object;
  creating an empty independent layer; and
  adding the map element to the independent layer.

When the storage medium performing the method, after adding the map element to the independent layer, the creating a geographic layer related to the request object based on the map query request further includes:
  acquiring at least one associated map element associated with the request object; and
  adding the associated map element to the independent layer.

When the storage medium performing the method, the method further comprising:
  displaying associated map elements associated with the request object distinguishably on other layers of the electronic map.

When the storage medium performing the method, the method further comprising:
  after displaying the independent layer to the user on the electronic map display interface, displaying map elements on other layers with reduced intensity.

When the storage medium performing the method, the method further comprising:
  after displaying the independent layer to the user on the electronic map display interface, changing display styles of other layers of the electronic map based on the attribute type of the request object.

When the storage medium performing the method, the method further comprising:
  after displaying the independent layer to the user on the electronic map display interface, providing a URL or a QR code for sharing a display interface of the independent layer.

Those skilled in art may readily appreciate, through the foregoing description of the embodiments, that the present disclosure may be implemented by software and necessary hardware. Naturally, the present disclosure may be implemented by hardware. However, the former is a better implementation in many cases. Based on such understanding, the technical solution of the present disclosure, or the portion that contributes over the prior art may be substantively represented in the form of software products. The computer software products may be stored in computer readable storage media, for example, a disk, an optical disk, a read-only memory (ROM) or a random access memory (RAM), and include instructions for causing a computer device (which may be a personal computer, a server, or a network device, etc.) to execute the methods described in each embodiment of the present disclosure.

It should be noted that in the embodiments of the above-mentioned apparatus for displaying map information, the included modules and sub-modules are delineated based on the functional logic, but not limited to the above-mentioned delineation as long as the corresponding functions can be achieved. Furthermore, the specific name of each functional unit is merely for facilitating distinguishing the functional units from one another, and does not intend to limit the protection scope of the present disclosure.

Each of the embodiments in the description is described progressively, each of the embodiments is focused on its differences from other embodiments. The identical or similar portions in each of the embodiments can refer to one another.

The foregoing is merely preferable embodiments of the present disclosure, the protection scope of the present disclosure is not limited thereto. Any variations or substitutions readily conceivable to those skilled in the art within the disclosed technical scope of the present disclosure shall fall into the protection scope of the present disclosure. Accordingly, the protection scope of the present disclosure is determined by the protection scope of the claims.

What is claimed is:

1. A method for displaying map information, comprising:
  acquiring a map query request submitted in connection with a request object;
  creating an independent layer related to the request object based on said map query request, wherein the creating comprises:
    acquiring at least one map element corresponding to the request object by matching names of map elements with a query word in said map query request;
    creating an empty independent layer;
    adding the acquired map element to the empty independent layer to form said independent layer;
  displaying the independent layer and map elements on other layers on an electronic map display interface, wherein the independent layer is superimposed with the other layers of the electronic map; and
  adjusting an intensity of the map elements on the other layers by setting a first scale thresholds for the request object on the independent layer and setting a second scale threshold for the map elements on the other layers, wherein in response to determining that a map scale of the electronic map is between the first and second scale thresholds, the request object on the independent layer is displayed and the map elements on the other layers is not displayed,
  wherein the method is performed by at least one processor.

2. The method according to claim 1, wherein the acquiring a map query request submitted related to a request object comprises:
  acquiring a text search word corresponding to the request object entered by a user, or scanning a QR code of the request object.

3. The method according to claim 1, wherein the creating an independent layer related to the request object based on the map query request, after adding the map element to the independent layer, further comprises:
  acquiring at least one associated map element associated with the request object, wherein the associated map element includes a service facility at a proximity of the request object; and
  adding the associated map element to the independent layer.

4. The method according to claim 1, the method further comprising:
  displaying an associated map element associated with the request object distinguishably on the other layers of the electronic map display interface.

5. The method according to claim 1, the method further comprising:
  changing display styles of the other layers of the electronic map based on an attribute type of the request object, a display style is implemented by a background color, the line attribute, and the building icon of the layer, after displaying the independent layer to a user on the electronic map display interface.

6. The method according to claim 1, the method further comprising:
providing a URL or a QR code for sharing a display interface of the independent layer, after displaying the independent layer to a user on the electronic map display interface.

7. The method according to claim 1, wherein the independent layer may be started or deactivated based on the user's input instruction on the display interface of the electronic map.

8. The method according to claim 1, wherein adjusting the intensity of the map elements on the other layers comprises reducing the intensity of the map elements.

9. The method according to claim 1, wherein in response to determining that the map scale is between the first and second scale thresholds, the method comprises not displaying a text description that would otherwise be displayed.

10. An apparatus for displaying map information, the apparatus comprising:
at least one processor; and
a memory storing instructions, which when executed by the at least one processor, cause the at least one processor to perform operations, the operations comprising:
acquiring a map query request submitted in connection with a request object;
creating an independent layer related to the request object based on said map query request, wherein the creating comprises:
acquiring at least one map element corresponding to the request object by matching names of map elements with a query word in said map query request;
creating an empty independent layer;
adding the acquired map element to the empty independent layer to form said independent layer;
displaying the independent layer and map elements on other layers on an electronic map display interface, wherein the independent layer is superimposed with the other layers of the electronic map; and
adjusting an intensity of the map elements on the other layers by setting a first scale thresholds for the request object on the independent layer and setting a second scale threshold for the map elements on the other layers, wherein in response to determining that a map scale of the electronic map is between the first and second scale thresholds, the request object on the independent layer is displayed and the map elements on the other layers is not displayed.

11. The apparatus according to claim 10, wherein the acquiring a map query request submitted related to a request object comprises:
acquiring a text search word corresponding to the request object entered by a user, or scanning a QR code of the request object.

12. The apparatus according to claim 10, wherein the creating an independent layer related to the request object based on the map query request, after adding the map element to the independent layer, further comprises:
acquiring at least one associated map element associated with the request object, wherein the associated map element includes a service facility at a proximity of the request object; and
adding the associated map element to the independent layer.

13. The apparatus according to claim 10, the operations further comprising:
displaying an associated map element associated with the request object distinguishably on the other layers of the electronic map display interface.

14. The apparatus according to claim 10, the operations further comprising:
changing display styles of the other layers of the electronic map based on an attribute type of the request object, a display style is implemented by a background color, the line attribute, and the building icon of the layer, after displaying the independent layer to a user on the electronic map display interface.

15. The apparatus according to claim 10, the operations further comprising:
providing a URL or a QR code for sharing a display interface of the independent layer, after displaying the independent layer to a user on the electronic map display interface.

16. A non-transitory computer storage medium storing computer executable instructions, the computer executable instructions configured to cause a computer processor to execute a method for displaying map information, the method comprising:
acquiring a map query request submitted in connection with a request object;
creating an independent layer related to the request object based on said map query request, wherein the creating comprises:
acquiring at least one map element corresponding to the request object by matching names of map elements with a query word in said map query request;
creating an empty independent layer;
adding the acquired map element to the empty independent layer to form said independent layer;
displaying the independent layer and map elements on other layers on an electronic map display interface, wherein the independent layer is superimposed with the other layers of the electronic map; and
adjusting an intensity of the map elements on the other layers by setting a first display scale thresholds for the request object on the independent layer and setting a second display scale threshold for the map elements on the other layers, wherein in response to determining that a map scale of the electronic map is between the first and second scale thresholds, the request object on the independent layer is displayed and the map elements on the other layers is not displayed.

* * * * *